US010654525B2

(12) United States Patent
Komiya et al.

(10) Patent No.: US 10,654,525 B2
(45) Date of Patent: May 19, 2020

(54) FRONT SUBFRAME STRUCTURE

(71) Applicant: MAZDA MOTOR CORPORATION, Hiroshima (JP)

(72) Inventors: Katsuyuki Komiya, Hiroshima (JP); Yasushi Ishikawa, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 114 days.

(21) Appl. No.: 15/906,634

(22) Filed: Feb. 27, 2018

(65) Prior Publication Data

US 2018/0273098 A1 Sep. 27, 2018

(30) Foreign Application Priority Data

Mar. 27, 2017 (JP) .................... 2017-060416

(51) Int. Cl.
*B62D 21/15* (2006.01)
*B62D 21/11* (2006.01)
(Continued)

(52) U.S. Cl.
CPC ............ *B62D 21/155* (2013.01); *B62D 21/11* (2013.01); *B60G 7/02* (2013.01);
(Continued)

(58) Field of Classification Search
CPC .................. B60G 2206/60; B60G 7/02; B60G 2204/1431; B62D 21/11; B62D 21/155; B60R 19/34
See application file for complete search history.

(56) References Cited

U.S. PATENT DOCUMENTS 6,511,096 B1 * 1/2003 Kunert ..................... B60G 7/02
  280/124.109
6,623,020 B1 * 9/2003 Satou ..................... B62D 21/11
  180/378
(Continued)

FOREIGN PATENT DOCUMENTS

EP    1184264 A1 *  3/2002  ............. B62D 21/15
JP    H06-270838 A    9/1994
(Continued)

OTHER PUBLICATIONS

An Office Action mailed by the Japanese Patent Office dated Oct. 2, 2018, which corresponds to Japanese Patent Application No. 2017-060416 and is related to U.S. Appl. No. 15/906,634.

*Primary Examiner* — Laura Freedman
(74) *Attorney, Agent, or Firm* — Studebaker & Brackett PC

(57) ABSTRACT

A front subframe structure includes front and rear cross members, a pair of left and right side members, and a vehicle body mounting portion disposed on front ends of the side members. The side member has a lateral widening portion at a front end thereof, wherein the lateral widening portion bulges outward in a vehicle width direction. The front cross member has a front widening portion at an end portion thereof in the vehicle width direction, wherein the front widening portion bulges forward of the vehicle. A portion of the front cross member excluding the front widening portion is disposed on the rear side with respect to the vehicle body mounting portion, and on the front side with respect to a rear end of the lateral widening portion.

11 Claims, 9 Drawing Sheets

(51) Int. Cl.
   *B60G 7/02*        (2006.01)
   *B60R 19/34*       (2006.01)
(52) U.S. Cl.
   CPC .. *B60G 2204/1431* (2013.01); *B60G 2206/60* (2013.01); *B60R 19/34* (2013.01)

(56) References Cited

U.S. PATENT DOCUMENTS

| | | | | |
|---|---|---|---|---|
| 7,008,007 | B2* | 3/2006 | Makita | B60R 19/24 |
| | | | | 280/784 |
| 7,213,873 | B2* | 5/2007 | Murata | B62D 21/11 |
| | | | | 296/187.09 |
| 7,517,006 | B2* | 4/2009 | Kageyama | B60R 21/34 |
| | | | | 296/187.09 |
| 7,810,878 | B2* | 10/2010 | Nakamura | B62D 21/155 |
| | | | | 296/203.02 |
| 8,267,429 | B2* | 9/2012 | Takeshita | B62D 21/155 |
| | | | | 280/784 |
| 8,511,416 | B2* | 8/2013 | Hiruma | B60K 1/00 |
| | | | | 180/291 |
| 8,596,711 | B2* | 12/2013 | Yasui | B60R 19/34 |
| | | | | 296/187.09 |
| 8,684,451 | B1* | 4/2014 | Park | B62D 25/08 |
| | | | | 296/203.02 |
| 8,746,718 | B2* | 6/2014 | Otani | B60G 7/02 |
| | | | | 280/124.109 |
| 9,016,767 | B2* | 4/2015 | Sotoyama | B62D 21/152 |
| | | | | 296/187.09 |
| 9,096,276 | B2* | 8/2015 | Komiya | B62D 21/155 |
| 9,233,714 | B2* | 1/2016 | Hara | B62D 21/09 |
| 9,561,824 | B2* | 2/2017 | Tamaoki | B62D 21/152 |
| 9,643,652 | B2* | 5/2017 | Hiramatsu | B62D 25/082 |
| 9,701,345 | B2* | 7/2017 | Kanemori | B62D 21/152 |
| 2003/0080587 | A1 | 5/2003 | Kitagawa | |
| 2010/0230981 | A1 | 9/2010 | Hock et al. | |
| 2013/0256051 | A1 | 10/2013 | Nakamura et al. | |
| 2018/0281863 | A1* | 10/2018 | Daikokuya | B62D 21/152 |
| 2019/0039652 | A1* | 2/2019 | Kamei | B62D 21/03 |
| 2019/0077207 | A1* | 3/2019 | Kanamaru | B60G 7/001 |
| 2019/0300059 | A1* | 10/2019 | Komiya | B62D 21/155 |

FOREIGN PATENT DOCUMENTS

| | | | | |
|---|---|---|---|---|
| JP | 2002173047 | A | * 6/2002 | |
| JP | 2002-255059 | A | 9/2002 | |
| JP | 2003-127893 | A | 5/2003 | |
| JP | 2005280651 | A | * 10/2005 | B60G 7/02 |
| JP | 2006-103591 | A | 4/2006 | |
| JP | 2006-175987 | A | 7/2006 | |
| JP | 2009-241709 | A | 10/2009 | |
| JP | 2010042742 | A | * 2/2010 | |
| JP | 2011031648 | A | * 2/2011 | |
| JP | 2012166739 | A | * 9/2012 | |
| JP | 2013-203241 | A | 10/2013 | |
| JP | 2013-212757 | A | 10/2013 | |
| JP | 2014080091 | A | * 5/2014 | |
| JP | 2016097734 | A | * 5/2016 | |
| JP | 2016-141282 | A | 8/2016 | |
| JP | 2016-172481 | A | 9/2016 | |
| JP | 2018083511 | A | * 5/2018 | |
| JP | 2018083512 | A | * 5/2018 | |
| JP | 2018161981 | A | * 10/2018 | |
| JP | 2018161982 | A | * 10/2018 | |
| JP | 2019018665 | A | * 2/2019 | |

\* cited by examiner

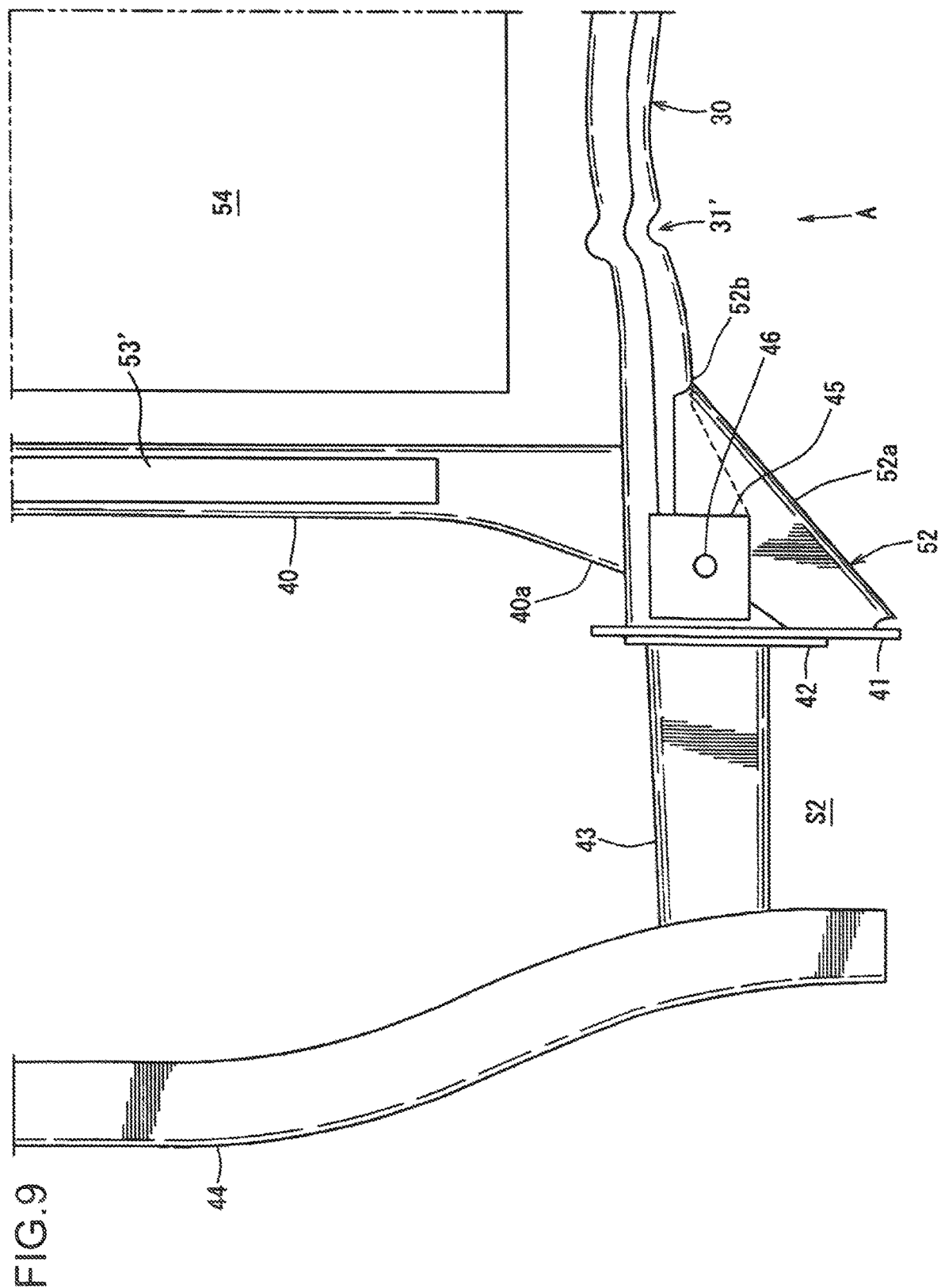

FRONT SUBFRAME STRUCTURE

TECHNICAL FIELD

The present invention relates to a front subframe structure for a vehicle for supporting a suspension arm.

BACKGROUND ART

Generally a front subframe for supporting a suspension arm is formed below a front side frame in a front portion of a vehicle. The front subframe includes a rear cross member extending in the vehicle width direction, a pair of left and right side members (front side members) extending forward of the vehicle from the rear cross member, and a front cross member for connecting front ends of the paired left and right side members in the vehicle width direction.

In recent years, there is a demand for providing a structure against a small overlap collision in a front portion of a vehicle. For example, Japanese Unexamined Patent Publication No. 2013-212757 (hereinafter, referred to as Patent Literature 1) discloses a structure, in which a projecting portion projecting outward in the vehicle width direction is not formed on a front subframe, but is formed on a front portion of a front side frame. The projecting portion is formed in such a manner that a lateral surface of the projecting portion on the outer side in the vehicle width direction is inclined inward in the vehicle width direction toward the rear side of a vehicle body in a plan view of the vehicle. Further, the projecting portion is disposed at a position where a power unit and the projecting portion overlap in the vehicle front-rear direction.

In the structure disclosed in Patent Literature 1, since the front side frame is bent inward in the vehicle width direction via the projecting portion when a small overlap collision occurs, it is possible to generate a moment for moving a front portion of a vehicle body in a sideways direction (allowing a front portion of a vehicle body to escape from a collision object) by causing the bent front side frame to press the power unit. However, in the structure disclosed in Patent Literature 1, since the front subframe does not include a front cross member, rigidity may be insufficient, and vibration is likely to occur when a member substantially equivalent to the projecting portion is formed on the front subframe.

Japanese Unexamined Patent Publication No. 2016-141282 (hereinafter, referred to as Patent Literature 2) discloses a front subframe structure including a pair of left and right side members, a front cross member for connecting from ends of the paired left and right side members in the vehicle width direction, a sub crash can having a trapezoidal shape in a plan view and connected to the front end of each side member via a set plate and a mounting plate, and a branching member for connecting a rear surface of a portion of a base portion of the sub crash can on the outer side in the vehicle width direction and a front portion of each side member in an obliquely opposite relationship.

In the structure disclosed in Patent Literature 2, it is possible to bend the side member inward in the vehicle width direction by transmitting a load generated when a small overlap collision occurs to a side member on the rear side via the branching member, after the load is received by the trapezoidal sub crash can.

However, in the structure disclosed in Patent Literature 2, a pair of left and right mounting portions for mounting the front subframe to a vehicle body are disposed at positions coincident with both ends of the front cross member. Therefore, it is necessary to set the position of the front cross member to a relatively forward position in order to secure the aforementioned positional relationship. On the other hand, it is general that an auxiliary component such as a radiator is disposed on the front side of a front cross member. However, when an auxiliary component is attempted to be disposed while securing a sufficient space for mounting and dismounting the auxiliary component on the front side of the front cross member, the auxiliary component and peripheral parts thereof may be disposed on the front side as a whole. This may increase an overhang dimension of the vehicle (a size of a portion located on the front side with respect to front wheels). As described above, in the structure disclosed in Patent Literature 2, it is difficult to simultaneously satisfy both requirements on a layout of an auxiliary component (securing a space for mounting and dismount an auxiliary component), and shortening an overhang dimension.

SUMMARY OF INVENTION

In view of the above, an object of the present invention is to provide a front subframe structure including a front cross member, which enables to enhance performance against collision by suppressing that bending deformation of a side member inward in the vehicle width direction is obstructed by the front cross member when a small overlap collision occurs, and to increase a degree of freedom in the layout of an auxiliary component and the like.

In order to achieve the aforementioned object, the present invention is directed to a front subframe structure for supporting a suspension arm. The front subframe structure includes: a rear cross member extending in a vehicle width direction; a pair of left and right side members extending forward of a vehicle from the rear cross member; a front cross member configured to connect front ends of the paired left and right side members in the vehicle width direction; and a vehicle body mounting portion disposed on a front end of the side member and configured to mount the side member to a vehicle body. The side member has a lateral widening portion at a front end thereof, wherein the lateral widening portion bulges outward in the vehicle width direction. The front cross member has a front widening portion at an end portion thereof in the vehicle width direction, wherein the front widening portion bulges forward of the vehicle. A portion of the front cross member excluding the front widening portion is disposed on a rear side with respect to the vehicle body mounting portion, and on a front side with respect to a rear end of the lateral widening portion.

These and other objects, features and advantages of the present invention will become more apparent upon reading the following detailed description along with the accompanying drawings.

BRIEF DESCRIPTION OF DRAWINGS

FIG. 9 is an enlarged plan view for describing a modification of the embodiment.

DESCRIPTION OF EMBODIMENTS

Figure 1:
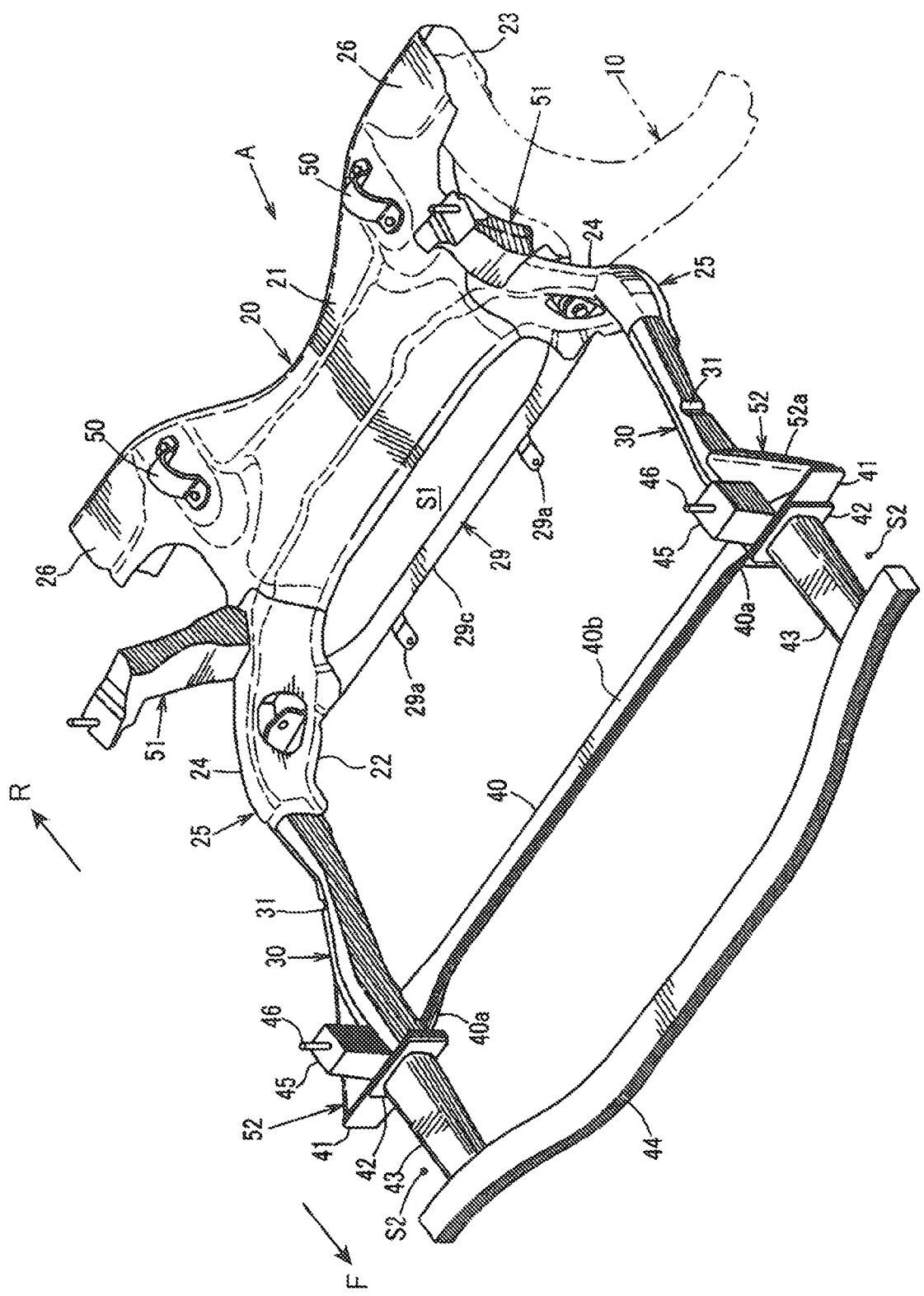
FIG. 1 is a perspective view illustrating a front subframe structure according to an embodiment of the present invention.
Figure 2:
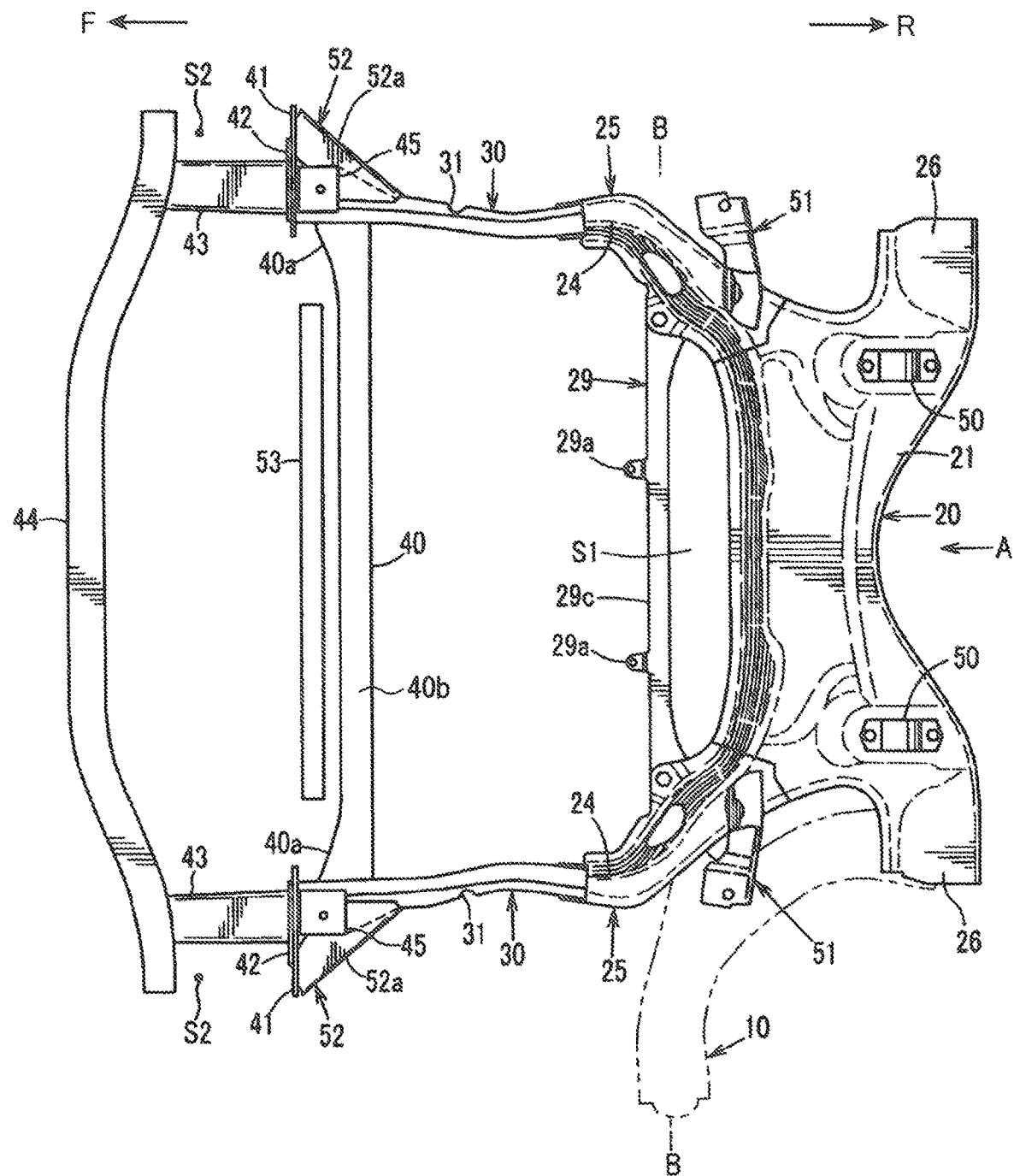
FIG. 2 is a plan view of the front subframe structure.
Figure 3:
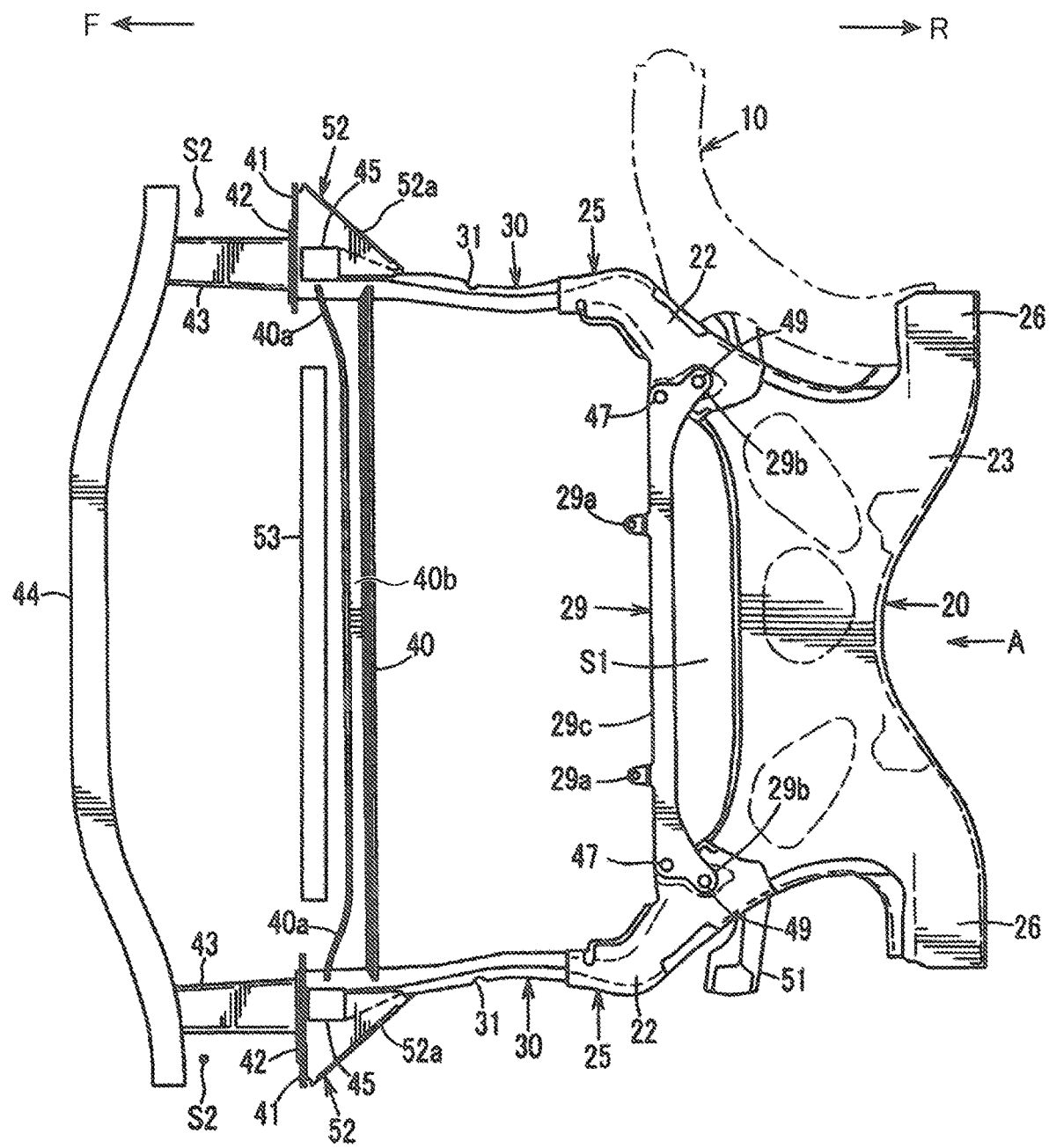
FIG. 3 is a bottom view of the front subframe structure.
Figure 4:
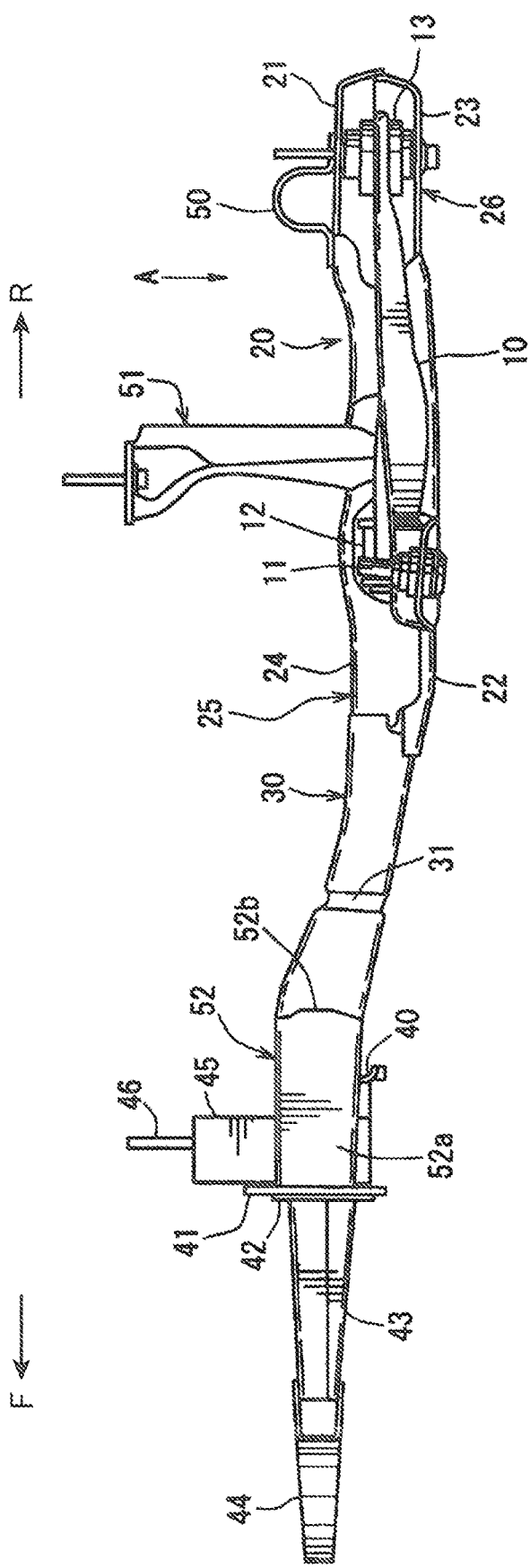
FIG. 4 is a side view of the front subframe structure.
Figure 5:
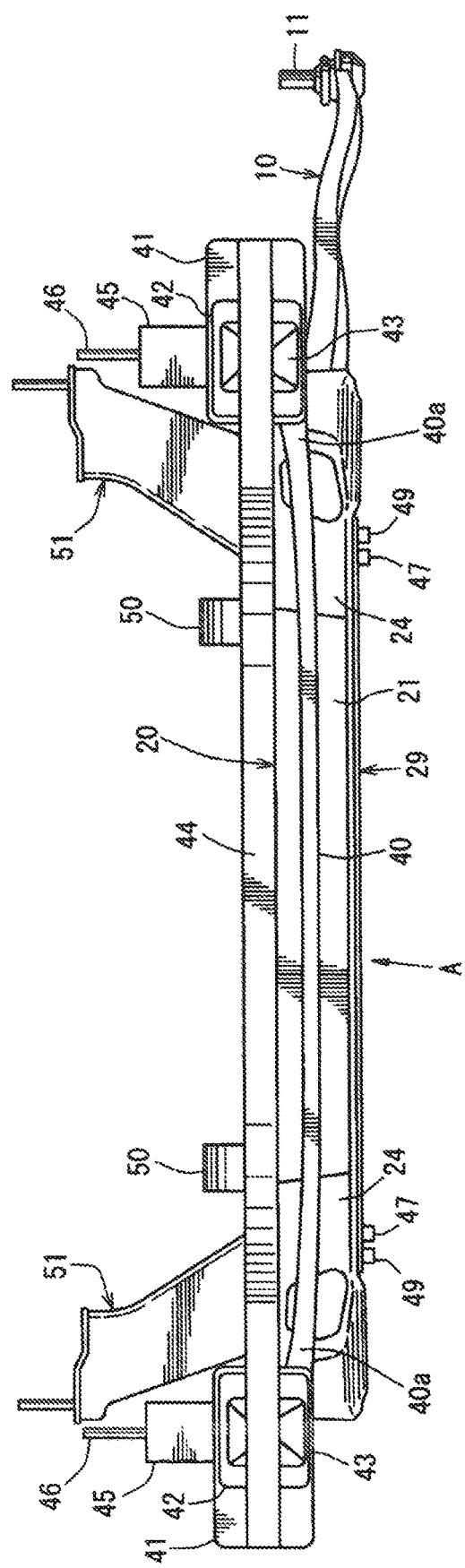
FIG. 5 is a front view of the front subframe structure.

In the following, a preferred embodiment of the present invention is described in detail with reference to the drawings. FIG. 1 to FIG. 5 respectively illustrate a front subframe structure of the embodiment. FIG. 1 is a perspective view, FIG. 2 is a plan view, FIG. 3 is a bottom view, FIG. 4 is a left side view, and FIG. 5 is a front view. In FIG. 1 to FIG. 4, the arrow F denotes a front side of a vehicle, and the arrow R denotes a rear side of the vehicle.

The front subframe structure of the embodiment is applied to a front-wheel drive automobile with a transversely mounted engine (hereinafter, simply referred to as a vehicle). The vehicle includes a front subframe A formed on a lower portion of an engine room in a front portion of the vehicle. The front subframe A includes a rear cross member 20 extending in the vehicle width direction, a pair of left and right front side members 30 and 30 (so-called extensions) extending forward of the vehicle from left ends of left and right lateral portions of the rear cross member 20, and a front cross member 40 for connecting front ends of the paired left and right front side members 30 and 30 in the vehicle width direction. In the following, the front side member 30 is simply referred to as the side member 30.

The front cross member 40 has a section of a substantially gate shape, and is formed to extend substantially straightforward in the vehicle width direction.

The rear cross member 20 is constituted by combining a plurality of members, and has a front-rear width larger than that of the front cross member 40 as a whole. Left and right lower arms 10 (in the drawings, only the lower arm 10 on the vehicle right side is illustrated) are supported on the rear cross member 20. The lower arm 10 is one of suspension arms.

On the front side of the front subframe A, there are disposed a pair of left and right sub crash cans 43 and 43 mounted on front ends of the paired left and right side members 30 and 30 via set plates 41 and mounting plates 42, and a lower bumper reinforcement 44 extending in the vehicle width direction for connecting front ends of the sub crash cans 43 and 43. The lower bumper reinforcement 44 constitutes a part of a bumper reinforcement.

A pillar-shaped pedestal portion 45 (corresponding to a vehicle body mounting portion in the present invention) extending in the up-down direction with a short size is formed on a front end of the side member 30 (a portion immediately behind the set plate 41). A fixing member 46 constituted by a fastening member such as an upward extending bolt is formed on an upper surface of the pedestal portion 45. The pedestal portion 45 and the fixing member 46 are members for mounting the side member 30 to an unillustrated front side frame (vehicle body).

Figure 6:
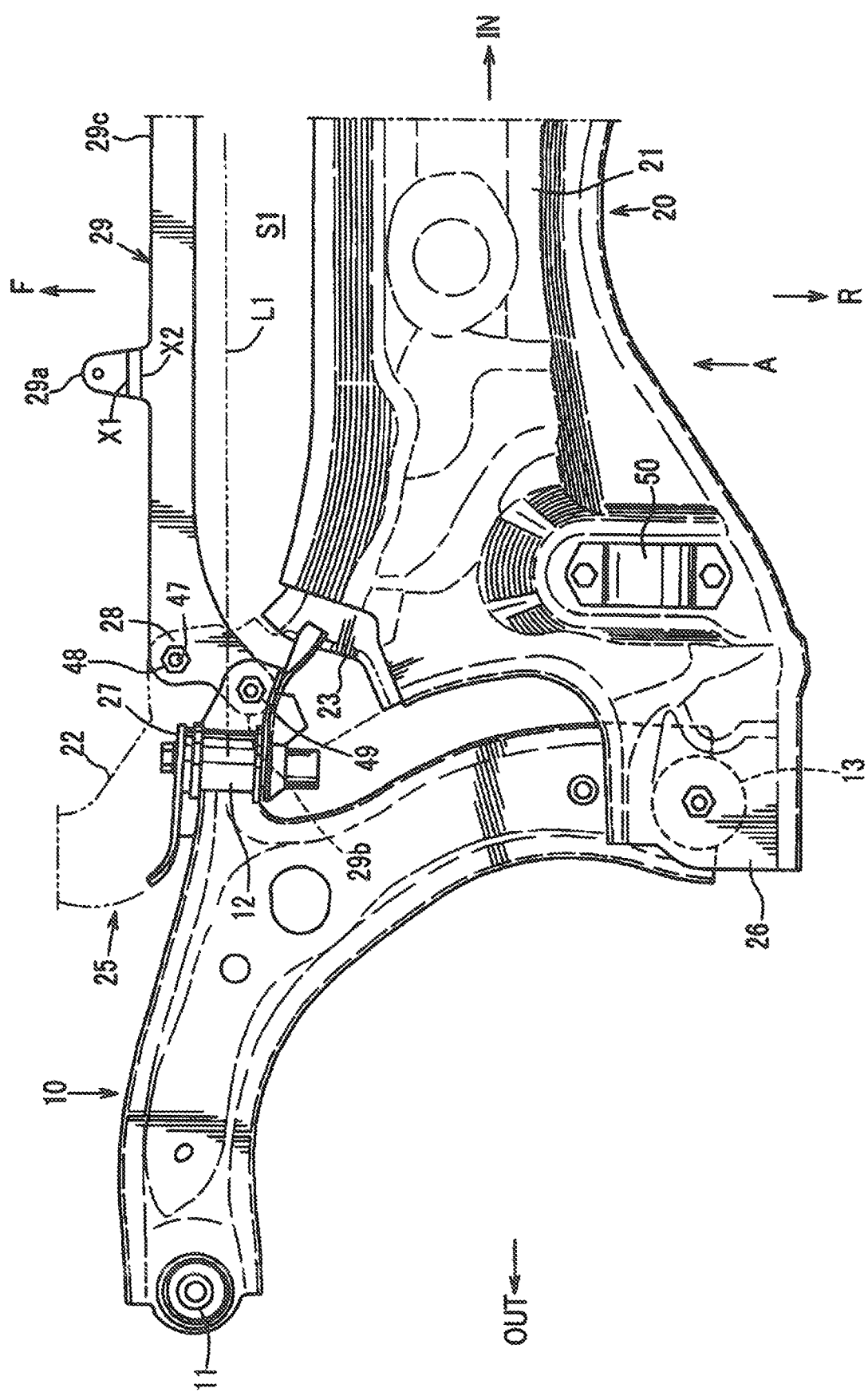
FIG. 6 is an enlarged plan view illustrating an end portion of a rear cross member in the vehicle width direction and a peripheral structure thereof.
Figure 7:
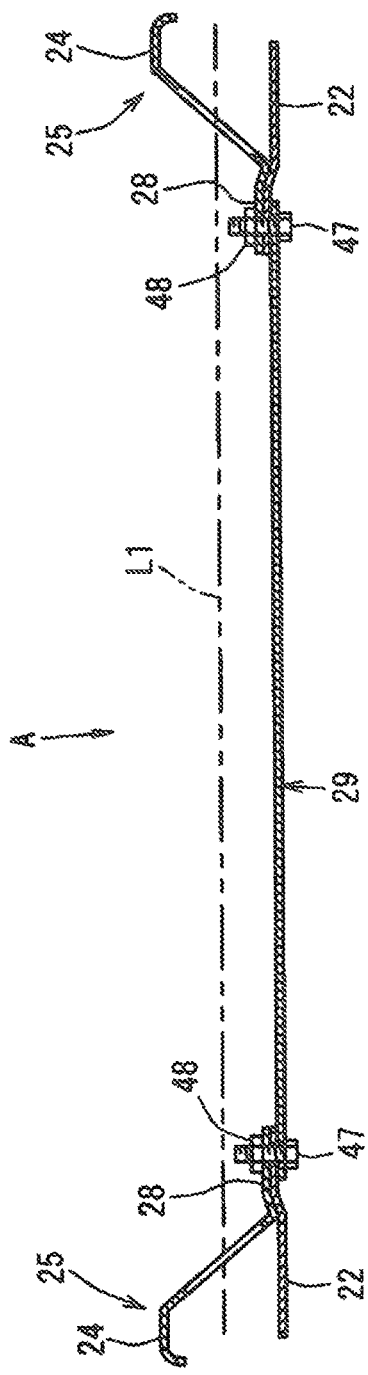
FIG. 7 is a sectional view taken along the line B-B in FIG. 2.

FIG. 6 is an enlarged plan view illustrating an end portion of the rear cross member 20 in the vehicle width direction, and a peripheral structure thereof. FIG. 7 is a sectional view taken along the line B-B in FIG. 2. In FIG. 6, the arrow IN denotes an inner side in the vehicle width direction, and the arrow OUT denotes an outer side in the vehicle width direction.

As illustrated in FIG. 4 to FIG. 6, the lower arm 10 includes a knuckle support portion 11 located on the outer side in the vehicle width direction and on the front side, a front bush portion 12 located on the inner side in the vehicle width direction and on the front side and a rear bush portion 13 located on the inner side in the vehicle width direction and on the rear side. The lower arm 10 is mounted to the vehicle body via the front bush portion 12 and the rear bush portion 13.

As illustrated in FIG. 1 to FIG. 4, and FIG. 6, the rear cross member 20 includes an upper panel 21, a lower panel 23 located on the lower side of the upper panel 21, and a pair of left and right extension portions 25 and 25 extending forward of the vehicle from left and right lateral portions of the upper panel 21 and the lower panel 2.3. Each of the extension portions 25 includes an extension upper panel 24 extending forward of the vehicle from the left and right lateral portions of the upper panel 21, and an extension lower panel 22 extending forward of the vehicle from the left and right lateral portions of the lower panel 23.

Rear ends of the paired left and right side members 30 and 30 are connected and fixed to front ends of the paired left and right extension portions 25 and 25.

As illustrated in FIG. 1 to FIG. 4, and FIG. 6, rear support portions 26 and 26 projecting outward in the vehicle width direction from left and right lateral portions of a rear portion of the rear cross member 20 are formed on the rear portion of the rear cross member 20. The rear support portion 26 is constituted by a part of the upper panel 21 and the lower panel 23, and supports the rear hush portion 13 of the lower arm 10.

As illustrated in FIG. 6, an arm support bracket 27 for supporting the front bush portion 12 of the lower arm 10 is mounted to the extension portion 25.

The arm support bracket 27 constitutes a front support portion of a suspension arm (lower arm 10). A connection portion 28 for a brace 29 (reinforcement member) to be described later is formed on a portion of the extension portion 25 offset forward and downward with respect to a center of support by the front support portion, specifically, a center of the front bush portion 12 supported by the arm support bracket 27 in the front-rear direction and in the vehicle width direction.

In FIG. 6 and FIG. 7, a line connecting centers of support by left and right front support portions is indicated by the line L1. As illustrated in FIG. 6, the connection portion 28 is located on the front side with respect to the line L1. Further, as illustrated in FIG. 7, the connection portion 28 is located on the lower side with respect to the line L1.

The brace 29 as a reinforcement member for linearly connecting the left and right connection portions 28 and 28 in the vehicle width direction is formed on the front side of the rear cross member 20. A plate-shaped member without beads is used as the brace 29. As illustrated in FIG. 7, in the embodiment, both ends of the brace 29 in the vehicle width direction are fastened and fixed to the connection portions 28 and 28 via fastening members such as bolts 47 and nuts 48.

As illustrated in FIG. 6, a space portion S1 is formed between a front perimeter of the rear cross member 20 (a front perimeter of each of the upper panel 21 and the lower panel 23), and a rear perimeter of the brace 29 by mounting the brace 29 between the left and right connection portions 28 and 28 as described above.

Further, rigidity of the front subframe A is enhanced, and low frequency vibration of about 300 Hz generated in the front subframe A is suppressed by linearly connecting the left and right connection portions 28 and 28 in the vehicle width direction by the brace 29. Thus, since support rigidity of the lower arm 10 in the vehicle width direction is enhanced, steering performance is enhanced.

As illustrated in FIG. 1. FIG. 2, FIG. 3, and FIG. 6, a plurality of undercover mounting portions 29a and 29a extending forward of the vehicle from a front perimeter of an intermediate portion of the brace 29 in the vehicle width direction in a stepwise manner are integrally formed on the intermediate portion of the brace 29. Specifically, as illustrated in FIG. 6, the undercover mounting portion 29a is formed into a bent shape including two ridge lines X1 and X2. An unillustrated undercover is mounted on the undercover mounting portion 29a. This makes it difficult to input a torsional load from the undercover to the brace 29. Therefore, it is possible to increase an effect of enhancing rigidity in the vehicle width direction by the brace 29, while securing mountability of the undercover by the undercover mounting portion 29a.

As illustrated in FIG. 1 to FIG. 3, the brace 29 is formed to connect the extension portions 25 and 25 located on the left side and the right side of a front end of the rear cross member 20. The side member 30 extends forward from a front end of each extension portion 25. This allows the brace 29 to play a role of enhancing rigidity of the side member 30. The front subframe A including the rear cross member 20, the extension portions 25 and 25, the side members 30 and 30, and the aforementioned front cross member 40 constitutes a so-called perimeter frame structure.

As illustrated in FIG. 3 and FIG. 6, a front perimeter 29c of the brace 29 is formed into a linear shape extending straightforward in the vehicle width direction. On the other hand, each of both ends of the brace 29 as a fastening portion by the bolt 47 and the nut 48 is widened rearward. Connection portions 29b and 29b for connecting the arm support bracket 27 are formed by the widening portion. Three members i.e. the connection portion 29b, the extension lower panel 22, and the arm support bracket 27 are fastened and fixed by a fastening member 49 such as a bolt and a nut. This makes it possible to further enhance rigidity and to suppress low frequency vibration.

As illustrated in FIG. 6, a center of support by a front support portion of the lower arm 10, in other words, a center of the front bush portion 12 supported by the arm support bracket 27 in the front-rear direction and in the vehicle width direction, and the knuckle support portion 11 are disposed in such a manner that respective positions thereof in the front-rear direction are substantially coincident. This makes it possible to enhance support rigidity of a wheel. Further, the brace 29 (a portion excluding the connection portions 29b and 29b on both ends of the brace 29) is disposed at a position offset forward with respect to the center of the knuckle support portion 11. The aforementioned space portion S1 is extended by the offset configuration. Thus, low frequency vibration is reduced.

Further, as illustrated in FIG. 3, FIG. 4, and FIG. 5, a front perimeter of a lower surface of the rear cross member 20, in other words, a front perimeter of the lower panel 23 is formed along a substantially horizontal plane. In some of the vehicles, a rear cross member may be curved into a saddle shape in a front view. In the embodiment, however, it is possible to sufficiently secure rigidity of the front subframe A by the aforementioned reinforcement effect by the brace 29, even if the rear cross member 20 is not curved.

As illustrated in FIG. 1, FIG. 2, and FIG. 4 to FIG. 6, a plurality of mounting brackets 50 for mounting a stabilizer are fastened and fixed to the upper panel 21 of the rear cross member 20. Further, as illustrated in FIG. 1, FIG. 2, FIG. 4, and FIG. 5, a tower portion 51 extending upward from a base portion (rear end) of the extension upper panel 24 of the rear cross member 20 is formed on the base portion. The tower portion 51 is a member for mounting the rear cross member 20 to an unillustrated front side frame.

Figure 8:
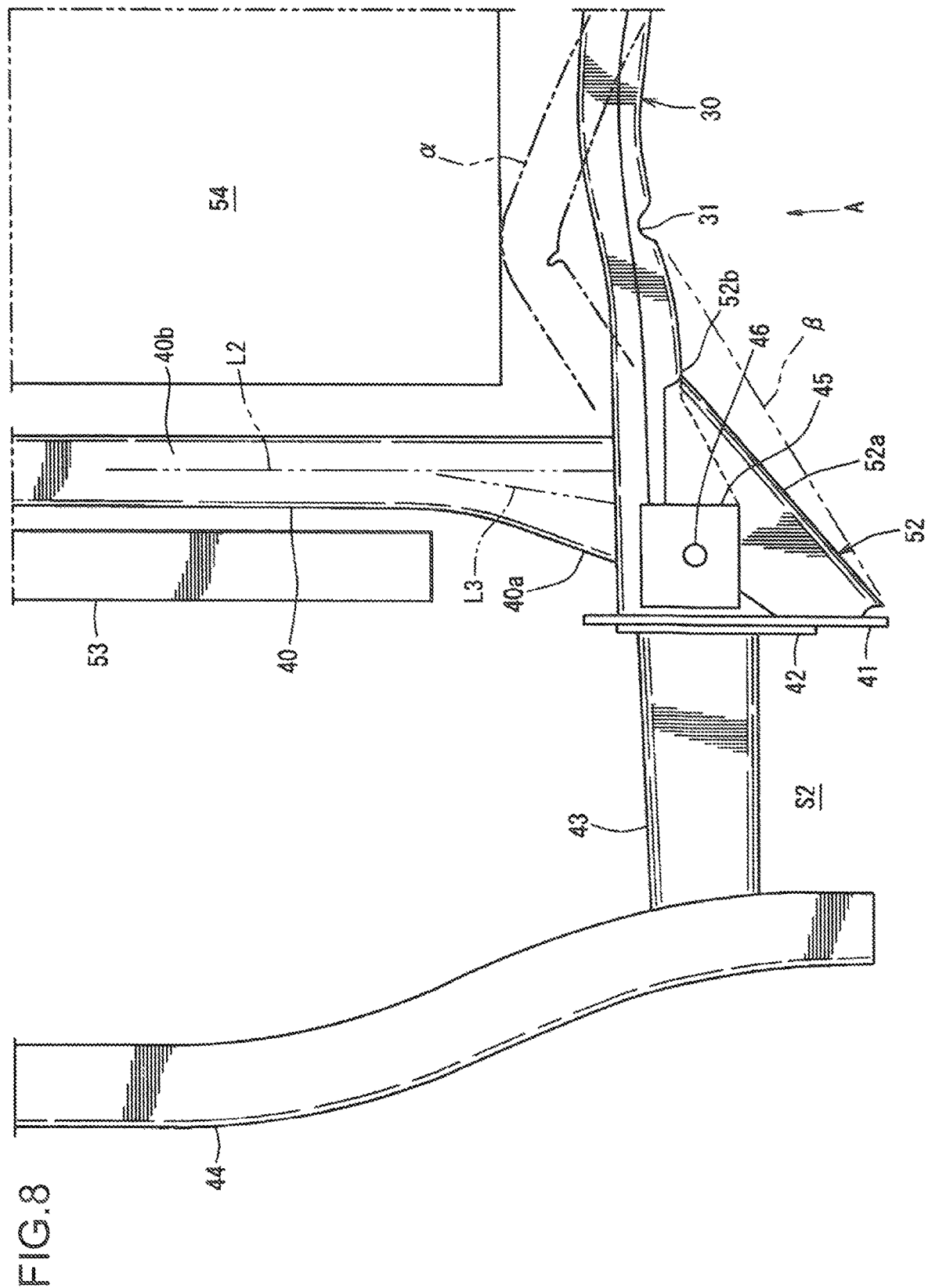
FIG. 8 is an enlarged plan view illustrating a front end of a side member and a peripheral structure thereof.

FIG. 8 is an enlarged plan view illustrating a front end of the side member 30 and a peripheral structure thereof.

As illustrated in FIG. 1 to FIG. 3, and FIG. 8, a front end of each of the side members 30 and 30 is provided with a lateral widening portion 52 as a countermeasure against a small overlap collision. Each of the lateral widening portions 52 and 52 bulges outward in the vehicle width direction.

Specifically, the lateral widening portion 52 is formed in such a manner that a projection amount of a front portion of the lateral widening portion 52 projecting outward in the vehicle width direction is larger than a projection amount of a rear portion of the lateral widening portion 52 projecting outward in the vehicle width direction. Thus, an outer lateral surface 52a as a lateral surface of the lateral widening portion 52 on the outer side in the vehicle width direction serves as a slant surface inclined inward in the vehicle width direction toward the rear side of the vehicle body. The lateral widening portion 52 is joined and fixed to each of the front end of the side member 30 and a rear surface of the set plate 41.

A front surface of the lateral widening portion 52 is rearward away from a rear surface of the lower bumper reinforcement 44. Thus, a space portion S2 defined by the front surface of the lateral widening portion 52 the rear surface of the lower bumper reinforcement 44, and an outer lateral surface (a surface on the outer side in the vehicle width direction) of the sub crash can 43 is formed in a front portion of the vehicle.

As illustrated in FIG. 1 and FIG. 8, a bending promotion portion 31 is formed on a portion of the side member 30 rearward away from a rear end 52b of the lateral widening portion 52. The bending promotion portion 31 is a recessed groove formed by recessing an outer lateral surface (a surface on the outer side in the vehicle width direction) of the side member 30 inward in the vehicle width direction and is formed to extend in the up-down direction in an area from an upper perimeter of the side member 30 to a lower perimeter thereof.

As illustrated in FIG. 4, a portion of the side member 30 located on the rear side with respect to the rear end 52b of the lateral widening portion 52 is formed to bend downward. On the other hand, the front end of the side member 30 and the lateral widening portion 52 are formed along a substantially horizontal plane. In this way, forming the lateral widening portion 52 along a substantially horizontal plane makes it possible to suppress application of a torsional force to a rotational moment on the lateral widening portion 52.

As illustrated in FIG. 1 to FIG. 3, and FIG. 8, both ends of the front cross member 40 in the vehicle width direction are respectively provided with a front widening portion 40a. Each of the front widening portions 40a and 40a bulges forward of the vehicle. In other words, the front cross member 40 includes a body portion 40b of a substantially fixed sectional shape and extending straightforward in the vehicle width direction, and the paired left and right front widening portions 40a and 40a projecting forward from both ends of the body portion 40b in the vehicle width direction.

As mainly illustrated in FIG. 8, the body portion 40b (a portion excluding the front widening portions 40a and 40a) of the front cross member 40 is disposed on the rear side with respect to the pedestal portion 45 for mounting the side member 30 to the vehicle body, and on the front side with respect to the rear end 52b of the lateral widening portion 52 of the side member 30.

The line L2 illustrated in FIG. 8 is a neutral axis of a front cross member as a comparative example in which the front widening portions 40a and 40a are omitted (in other words, a front cross member constituted only by the body portion 40b). The line L3 is a neutral axis of the front cross member 40 according to the embodiment in which the front widening portions 40a and 40a are included (in other words, a front cross member constituted by the body portion 40b and the paired front widening portions 40a and 40a). The neutral axis is not expanded or contracted when bending deformation occurs. In other words, neither a tensile stress nor a compressive stress occurs in a section on the neutral axis when the front cross member 40 is subjected to bending deformation.

As is comprehensible from comparison between the lines L2 and L3, the neutral axis (line L3) of the front cross member 40 including the front widening portions 40a and 40a according to the embodiment is located on the vehicle front side than the neutral axis (line L2) of the front cross member as the comparative example in an area corresponding to both ends of the front cross member 40 in the vehicle width direction close to the side member 30. This means that the neutral axis (center of rigidity) of the front cross member 40 comes close to the fixing member 46 of the pedestal portion 45 (center of rotation of the lateral widening portion 52 when a small overlap collision occurs).

It can be said that the neutral axis (line L2) of the front cross member as the comparative example is a neutral axis when it is assumed that both ends of the front cross member in the vehicle width direction have a same shape as the shape of an intermediate portion of the front cross member located at an intermediate position between the both ends. In other words, in the embodiment, the neutral axis (line L3) is offset forward, as compared with the comparative example, by forming both ends of the front cross member 40 in the vehicle width direction into a shape different from the shape of the intermediate portion.

As illustrated in FIG. 8, an auxiliary component 53 constituted by e.g. a heat exchanger is disposed on the front side of the front cross member 40. The front widening portions 40a and 40a are formed by widening portions of the front cross member 40 on the outer side in the vehicle width direction with respect to the auxiliary component 53 forward of the vehicle.

As illustrated in FIG. 8, the auxiliary component 53 is disposed away from the pedestal portion 45 on the inner side in the vehicle width direction at a position substantially coincident with the pedestal portion 45 in the front-rear direction. The front widening portion 40a of the front cross member 40 is formed between the auxiliary component 53 and the pedestal portion 45 in such a manner that the front widening portion 40a is widened forward than a rear end of each of the auxiliary component 53 and the pedestal portion 45. In other words, the auxiliary component 53 is disposed at such a position that it overlaps with the Front widening portion 40a and the pedestal portion 45 in the front-rear direction. In this example, the expression that a member A and a member B overlap in the front-rear direction means that the member A and the member B have a positional relationship that enables to define an imaginary straight line passing through the member A and the member and extending in the vehicle width direction in a plan view of the vehicle.

A powertrain 54 including a transversely disposed engine is provided on the rear side of the front cross member 40 and between the paired left and right side members 30 and 30. The bending promotion portion 31 of each of the side members 30 and 30 is located on the outer side of the powertrain 54 in the vehicle width direction.

As described above, in the embodiment, the body portion 40b (a portion excluding the front widening portions 40a and 40a) of the front cross member 40 is disposed on the rear side with respect to the pedestal portion 45, and a neutral axis (center of rigidity) of the front cross member 40 is offset forward from the line L2 to the line L3 and comes close to the center of rotation (fixing member 46). This makes it possible to suppress that bending deformation of the side member 30 inward in the vehicle width direction is obstructed when a small overlap collision occurs and thereby to enhance performance against collision, while increasing a degree of freedom in the layout of the auxiliary component 53.

Specifically, when a small overlap collision occurs, and a collision load is input to the lateral widening portion 52 from an end portion of the lower bumper reinforcement 44 via the set plate 41, the collision load is transmitted rearward via the lateral widening portion 52, and is exerted on the side member 30. In response to application of the collision load, the side member 30 is urged in such a direction as to turn around the pedestal portion 45 (particularly, around the fixing member 46 of the pedestal portion 45). Then, as illustrated by the imaginary line α in FIG. 8, the side member 30 is deformed to be bent inward in the vehicle width direction. The side member 30 bent as described above presses the powertrain 54 inward in the vehicle width direction, and a moment for moving a front portion of the vehicle in a sideways direction is generated by the pressing force of the side member 30.

In this case, if the front cross member 40 is largely displaced rearward from the center of rotation (fixing member 46), bending of the side member 30 inward in the vehicle width direction is obstructed by the front cross member 40. On the other hand, in the embodiment, since the neutral axis (center of rigidity) of the front cross member 40 is offset forward from the line L2 to the line L3, it is possible to suppress that bending of the side member 30 inward in the vehicle width direction is obstructed by the front cross member 40, and it is possible to enhance performance against collision.

Further, in the embodiment, as illustrated in FIG. 8, since the auxiliary component 53 constituted by e.g., a heat exchanger is disposed on the front side of the front cross member 40, and the front widening portion 40a widened forward of the vehicle is formed on a portion of the front cross member 40 on the outer side in the vehicle width direction with respect to the auxiliary component 53, a degree of freedom in the layout is further increased. In particular, since the auxiliary component 53 is disposed on the rear side as much as possible, it is possible to shorten an overhang dimension of the vehicle, and to sufficiently secure a space for absorbing a load when a light collision occurs.

Further, in the embodiment, as illustrated in FIG. 2 and FIG. 8, the lower bumper reinforcement 44 is mounted on front ends of the paired left and right side members 30 and 30 via the sub crash cans 43 and 43, and a front surface of the lateral widening portion 52 and a rear surface of the lower bumper reinforcement 44 are away from each other in the vehicle front-rear direction. Therefore, the space S2 is formed between the front surface of the lateral widening portion 52 and the rear surface of the lower bumper reinforcement 44 (on the outer side of the sub crash can 43 in the vehicle width direction). Thus, when a collision load is input to an end portion of the lower bumper reinforcement 44, the sub crash can 43 is deformed to crash in the front-rear direction by the load transmitted rearward substantially linearly from the end portion, and the collision load is absorbed by the crash deformation. Thereafter, when the load is transmitted to the lateral widening portion 52, the side member 30 is easily bent by the aforementioned mechanism, and the collision load is further absorbed by the bending deformation.

In addition to the above, as illustrated in FIG. 8, the bending promotion portion 31 recessed inward in the vehicle width direction and extending in the up-down direction is formed on a portion of the side member 30 rearward away from the rear end 52b of the lateral widening portion 52. Further, the powertrain 54 is provided on the inner side of the bending promotion portion 31 in the vehicle direction. According to the aforementioned configuration, since bending deformation of the side member 30 inward in the vehicle width direction is promoted by the bending promotion portion 31 when a small overlap collision occurs, it is possible to securely interfere the side member 30 with the powertrain 54. Thus, it is possible to generate a moment for moving a front portion of the vehicle in a sideways direction, and it is possible to allow the front portion of the vehicle to escape from a collision object by using the moment.

As described above, in the front subframe structure of the embodiment, the body portion 40b (a portion excluding the front lateral portions 40a and 40a) of the front cross member 40 is disposed on the vehicle rear side with respect to the fixing member 46 of the pedestal portion 45, and the front cross member 40 is formed in such a manner that a neural axis (line L3) of the front cross member 40 is offset forward. Therefore, it is possible to suppress that bending of the side member 30 is obstructed by the front cross member 40, while avoiding interference of the auxiliary component 53 with the front cross member 40.

In this example, as illustrated by the imaginary line β in FIG. 8, when the rear end 52b of the lateral widening portion 52 extends rearward to the bending promotion portion 31, a component of rotational moment inward in the vehicle width direction when the side member 30 is bent is reduced, which is not preferable. In view of the above, in the embodiment, the rear end 52b of the lateral widening portion 52 is away forward from the bending promotion portion 31.

SUMMARY

The following is a summary of features of the embodiment.

The embodiment relates to a front subframe structure for supporting the lower arms 10 (suspension arms). The front subframe structure includes the rear cross member 20 extending in the vehicle width direction, the paired left and right side members 30 and 30 extending forward of the vehicle from the rear cross member 20, the front cross member 40 configured to connect front ends of the paired left and right side members 30 and 30 in the vehicle width direction, and the pedestal portion 45 (vehicle body mounting portion) disposed on a front end of each side member 30 and configured to mount each side member 30 to the front side frame (vehicle body). Each side member 30 has a lateral widening portion 52 at a front end thereof wherein the lateral widening portion 52 bulges outward in the vehicle width direction. The front cross member 40 has a front widening portion 40a at each end portion thereof in the vehicle width direction, wherein the front widening portion 40a bulges forward of the vehicle. A portion of the front cross member 40 excluding the front widening portions 40a and 40a, in other words, the body portion 40b is disposed on the rear side with respect to the pedestal portion 45, and on the front side with respect to the rear end 52b of the lateral widening portion 52 (see FIG. 1 and FIG. 8).

According to the aforementioned configuration, the portion of the front cross member 40 excluding the front widening portions 40a and 40a is disposed on the rear side with respect to the pedestal portion 45, and a neutral axis (line L3) of the front cross member 40 is offset forward by formation of the front widening portion 40a. Therefore, it is possible to suppress that bending deformation of the side member 30 inward in the vehicle width direction is obstructed when a small overlap collision occurs and a collision load is input to the lateral widening portion 52 of the side member 30 and thereby to enhance performance against collision, while increasing a degree of freedom in the layout of the auxiliary component 53 and the like.

Specifically, when a small overlap collision occurs, and a collision load is input to the lateral widening portion 52, the collision load is transmitted rearward via the lateral widening portion 52, and is exerted on the side member 30. In response to application of the collision load, the side member 30 is urged in such a direction as to turn around the pedestal portion 45 (particularly, around the fixing member 46 of the pedestal portion 45). Then, the side member 30 is deformed to be bent inward in the vehicle width direction. The side member 30 bent as described above presses the powertrain 54 inward in the vehicle width direction. Further, a moment for moving a front portion of the vehicle in a sideways direction is generated by the pressing force of the side member 30. In the embodiment, since a neutral axis (line L3) of the front cross member 40 is offset forward, it is possible to suppress that bending deformation of the side member 30 inward in the vehicle width direction is obstructed by the front cross member 40. Thus, it is possible to enhance performance against collision.

In the embodiment, the auxiliary component 53 constituted by e.g. a heat exchanger is disposed on the front side of the front cross member 40, and the front widening portion 40a is disposed on the outer side in the vehicle with direction with respect to the auxiliary component 53 (see FIG. 8).

According to the aforementioned configuration, since the auxiliary component 53 is disposed on the rear side as much as possible, it is possible to shorten an overhang dimension of the vehicle, and to sufficiently secure a space for absorbing a load when a light collision occurs.

In the embodiment, the lower bumper reinforcement 44 (bumper reinforcement) extending in the vehicle width direction is mounted to front ends of the paired left and right side members 30 and 30 via the sub crash cans 43 and 43 (crash cans), and a front surface of the lateral widening portion 52 and a rear surface of the lower bumper reinforcement 44 are disposed away from each other in the vehicle front-rear direction so that the space portion S2 exists between the front surface and the rear surface (see FIG. 1 and FIG. 8).

According to the aforementioned configuration, when a collision load is input to an end portion of the lower bumper reinforcement 44, the sub crash can 43 is deformed to crash in the front-rear direction by the load transmitted rearward substantially linearly from the end portion, and the collision load is absorbed by the crash deformation. Thereafter, when the load is transmitted to the lateral widening portion 52, the side member 30 is easily bent by the aforementioned mechanism, and the collision load is further absorbed by the bending deformation.

In the embodiment, the bending promotion portion 31 is disposed on a portion of the side member 30 rearward away from the lateral widening portion 52, and the power train 54 is provided on the inner side of the bending promotion portion 31 in the vehicle width direction (see FIG. 8).

According to the aforementioned configuration, bending deformation of the side member 30 inward in the vehicle width direction is promoted when a small overlap collision occurs, and the side member 30 and the powertrain 54 securely interfere with each other. Thus, since a moment for moving a front portion of the vehicle in a sideways direction is generated, it is possible to allow the front portion of the vehicle to escape from a collision object in a sideways direction.

In the foregoing, a preferred embodiment of the present invention is described. The present invention, however, is not limited to the embodiment, and various modifications are applicable as far as the modifications do not depart from the gist of the present invention.

For example, as illustrated in FIG. 9, an auxiliary component 53' may be disposed on a front cross member 40. In this case, since a space on the front side of the front cross member 40 is increased, the space is used as a space for mounting and dismounting the auxiliary component 53' for repair or exchange. Thus, the repair or the exchange is made easy.

Further, also as illustrated in FIG. 9, a curved portion formed by curving a midway portion of a side member 30 in the vehicle width direction may be formed as a bending promotion portion 31'.

SUMMARY OF PRESENT INVENTION

The present invention relates to a front subframe structure for supporting a suspension arm. The front subframe structure includes: a rear cross member extending in a vehicle width direction; a pair of left and right side members extending forward of a vehicle from the rear cross member; a front cross member configured to connect front ends of the paired left and right side members in the vehicle width direction; and a vehicle body mounting portion disposed on a front end of the side member and configured to mount the side member to a vehicle body. The side member has a lateral widening portion at a front end thereof, wherein the lateral widening portion bulges outward in the vehicle width direction. The front cross member has a front widening portion at an end portion thereof in the vehicle width direction, wherein the front widening portion bulges forward of the vehicle. A portion of the front cross member excluding the front widening portion is disposed on a rear side with respect to the vehicle body mounting portion, and on a front side with respect to a rear end of the lateral widening portion.

According to the aforementioned configuration, a portion of the front cross member excluding the front widening portion is disposed on the rear side with respect to the vehicle body mounting portion, and a neutral axis (center of rigidity) of the front cross member is offset forward by formation of the front widening portion. Therefore, it is possible to suppress that bending deformation of the side member inward in the vehicle width direction is obstructed when a small overlap collision occurs and a collision load is input to the lateral widening portion of the side member and thereby to enhance performance against collision, while increasing a degree of freedom in the layout of an auxiliary component and the like.

Specifically, when a small overlap collision occurs, and a load is input to the lateral widening portion, the collision load is transmitted rearward via the lateral widening portion, and is exerted on the side member. In response to application of the collision load, the side member is urged in such a direction as to turn around the vehicle body mounting portion. Then, the side member is deformed to be bent inward in the vehicle width direction. The side member bent as described above presses the powertrain inward in the vehicle width direction. Further, a moment for moving a front portion of the vehicle in a sideways direction is generated by the pressing force of the side member. According to the aforementioned configuration, in which the neutral axis of the front cross member is offset forward, bending deformation of the side member inward in the vehicle width direction is obstructed by the front cross member is suppressed. Therefore, it is possible to enhance performance against collision.

Preferably, an auxiliary component may be disposed on a front side of the front cross member, and the front widening portion may be disposed on an outer side in the vehicle width direction with respect to the auxiliary component.

According to the aforementioned configuration, since the auxiliary component is disposed on the rear side as much as possible, it is possible to shorten an overhang dimension of the vehicle, and to sufficiently secure a space for absorbing a load when a light collision occurs.

The auxiliary component may be disposed on the front cross member. In this case, since a space on the front side of the front cross member is increased, the space is used as a space for mounting and dismounting the auxiliary component for repair or exchange. Thus, the repair or the exchange is made easy.

Preferably, a bumper reinforcement extending, in the vehicle width direction may be mounted on a front end of each of the paired left and right side members via a crash can. A front surface of the lateral widening portion and a rear surface of the bumper reinforcement may be disposed away from each other in a vehicle front-rear direction so that a space portion exists between the front surface and the rear surface.

According to the aforementioned configuration, when a collision load is input to an end portion of the bumper reinforcement, the crash can is deformed to crash in the front-rear direction by the load transmitted rearward substantially linearly from the end portion, and the collision load is absorbed by the crash deformation. Thereafter, when the load is transmitted to the lateral widening portion, the side member is easily bent by the aforementioned mechanism, and the collision load is further absorbed by the bending deformation.

Preferably, a bending promotion portion may be disposed on a portion of the side member rearward away from the lateral widening portion. A powertrain may be provided on an inner side of the bending promotion portion in the vehicle width direction.

According to the aforementioned configuration, when a small overlap collision occurs bending deformation of the side member inward in the vehicle width direction is promoted, and the side member and the powertrain securely interfere with each other. Since a moment for moving a front portion of the vehicle in a sideways direction is generated, it is possible to allow the front portion of the vehicle to escape from a collision object in a sideways direction.

Prefrably, the auxiliary component may be disposed at such a position that it overlaps with the front widening portion and the vehicle body mounting portion in a vehicle front-rear direction.

According to the aforementioned configuration, it is possible to suppress that bending deformation of the side member is obstructed by the front cross member when collision occurs, while disposing the auxiliary component close to the front cross member as much as possible. Thus, it is possible to simultaneously satisfy both requirements i.e. shortening an overhang dimension of the vehicle, and enhancing performance against collision at a high level.

Preferably, the bending promotion portion may be a recessed groove in an outer lateral surface on a portion of the side member rearward away from the lateral widening portion. The recessed groove may be recessed inward in the vehicle width direction, and may extend in an up-down direction.

According to the aforementioned configuration, it is possible to effectively promote bending deformation of the side member when collision occurs by the bending promotion portion constituted by the recessed groove.

The bending promotion portion may be a curved portion in a portion of the side member rearward away from the lateral widening portion. The curved portion may be curved inward in the vehicle width direction.

According to the aforementioned configuration, it is possible to effectively promote bending deformation of the side member when collision occurs.

This application is based on Japanese Patent Application No. 2017-060416 filed on Mar. 27, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A front subframe structure for supporting a suspension arm, comprising:
   a rear cross member extending in a vehicle width direction;
   a pair of left and right side members extending from the rear cross member in a forward vehicle direction;
   a front cross member configured to connect front ends of the paired left and right side members in the vehicle width direction; and
   a vehicle body mounting portion disposed on a front end of each side member and configured to mount the respective side member to a vehicle body, wherein
   each side member has a lateral widening portion at a front end thereof, each lateral widening portion bulging outward in the vehicle width direction,
   the front cross member has a body portion extending in the vehicle width direction between the pair of side members, and a front widening portion formed on a front side of an end portion in the vehicle width direction of the body portion, the front widening portion projecting forward in the forward vehicle direction from a front surface of the body portion, and
   all of the body portion of the front cross member is disposed on a rear side with respect to the vehicle body mounting portion, and on a front side with respect to a rear end of each lateral widening portion.

2. The front subframe structure according to claim 1, wherein
   an auxiliary component is disposed on a front side of the front cross member, and
   the front widening portion is disposed on an outer side in the vehicle width direction with respect to the auxiliary component.

3. The front subframe structure according to claim 2, wherein
   the auxiliary component is disposed at such a position that it overlaps with the front widening portion and the vehicle body mounting portion in a vehicle front-rear direction.

4. The front subframe structure according to claim 1, wherein
   a bumper reinforcement extending in the vehicle width direction is mounted on a front end of each of the paired left and right side members via a crash can, and
   a front surface of each lateral widening portion and a rear surface of the respective bumper reinforcement are disposed away from each other in a vehicle front-rear direction so that a space portion exists between the respective front surface and the respective rear surface.

5. The front subframe structure according to claim 1, wherein
   a bending promotion portion is disposed on a portion of each side member that is rearward of and spaced away from the respective lateral widening portion, and
   a powertrain is provided on an inner side of each bending promotion portion in the vehicle width direction.

6. The front subframe structure according to claim 5, wherein
   each bending promotion portion is a recessed groove in an outer lateral surface on the portion of the respective side member that is rearward of and spaced away from the respective lateral widening portion, and
   each recessed groove is recessed inward in the vehicle width direction, and extends in an up-down direction.

7. The front subframe structure according to claim 5, wherein
   each bending promotion portion is a curved portion in the portion of the respective side member that is rearward of and spaced away from the respective lateral widening portion, and
   each curved portion is curved inward in the vehicle width direction.

8. A front subframe structure for supporting a suspension arm, comprising:
   a rear cross member extending in a vehicle width direction;
   a pair of left and right side members extending from the rear cross member in a forward vehicle direction;
   a front cross member configured to connect front ends of the paired left and right side members in the vehicle width direction; and
   a vehicle body mounting portion disposed on a front end of each side member and configured to mount the respective side member to a vehicle body, wherein
   each side member has a lateral widening portion at a front end thereof, each lateral widening portion bulging outward in the vehicle width direction,
   both ends of the front cross member in the vehicle width direction have a shape different from a shape of an intermediate portion of the front cross member excluding the both ends so that a neutral axis of the front cross member is offset in the forward vehicle direction, as compared with a configuration, in which both ends of a front cross member in a vehicle width direction have a shape identical to the shape of the intermediate portion, and the intermediate portion of the front cross member is disposed on a rear side with respect to the vehicle body mounting portion, and on a front side with respect to a rear end of each lateral widening portion.

9. The front subframe structure according to claim 8, wherein each of the both ends of the front cross member in the vehicle width direction has a shape such that each of the both ends extends more forward in the forward vehicle direction than the intermediate portion.

10. A front subframe structure for supporting a suspension arm, comprising:

a rear cross member extending in a vehicle width direction;

a pair of left and right side members extending from the rear cross member in a forward vehicle direction;

a front cross member configured to connect front ends of the paired left and right side members in the vehicle width direction; and a vehicle body mounting portion disposed on a front end of each side member and configured to mount the respective side member to a vehicle body, wherein each side member has a lateral widening portion at a front end thereof, each lateral widening portion bulging outward in the vehicle width direction, a portion of the front cross member at least excluding both ends thereof in the vehicle width direction is disposed on a rear side with respect to the vehicle body mounting portion, and on a front side with respect to a rear end of the lateral widening portion, and a bending promotion portion configured to bend the side member inward in the vehicle width direction when a collision load is input on a portion of each side member that is rearward of and spaced away from the respective lateral widening portion, wherein each bending promotion portion is a recessed groove in an outer lateral surface on the portion of the respective side member that is rearward of and spaced away from the respective lateral widening portion, and each recessed groove is recessed inward in the vehicle width direction, and extends in an up-down direction.

11. The front subframe structure according to claim 10, wherein each bending promotion portion is a curved portion in the portion of the respective side member that is rearward of and spaced away from the respective lateral widening portion, and each curved portion is curved inward in the vehicle width direction.

* * * * *